US008627002B2

(12) United States Patent
Mannenbach et al.

(10) Patent No.: US 8,627,002 B2
(45) Date of Patent: Jan. 7, 2014

(54) METHOD TO INCREASE PERFORMANCE OF NON-CONTIGUOUSLY WRITTEN SECTORS

(75) Inventors: David F. Mannenbach, Tucson, AZ (US); Karl A. Nielsen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/549,038

(22) Filed: Oct. 12, 2006

(65) Prior Publication Data

US 2008/0091875 A1  Apr. 17, 2008

(51) Int. Cl.
*G06F 12/08* (2006.01)
(52) U.S. Cl.
USPC .................................. 711/113; 711/E12.041
(58) Field of Classification Search
USPC .......................................... 711/113, 118, 146
See application file for complete search history.

(56) References Cited

U.S. PATENT DOCUMENTS

| 5,371,855 | A | * | 12/1994 | Idleman et al. ................ 711/113 |
| 5,408,644 | A | | 4/1995 | Schneider et al. |
| 5,860,090 | A | | 1/1999 | Clark |
| 6,334,168 | B1 | | 12/2001 | Islam et al. |
| 6,704,837 | B2 | | 3/2004 | Beardsley et al. |
| 6,785,771 | B2 | | 8/2004 | Ash et al. |
| 7,702,780 | B2 | * | 4/2010 | Allen et al. .................... 709/224 |
| 2002/0062422 | A1 | * | 5/2002 | Butterworth et al. ......... 711/114 |
| 2002/0178331 | A1 | * | 11/2002 | Beardsley et al. ............ 711/137 |
| 2003/0120866 | A1 | * | 6/2003 | Stoutamire .................... 711/118 |
| 2004/0250022 | A1 | * | 12/2004 | Jarvis et al. ................... 711/118 |
| 2006/0190924 | A1 | * | 8/2006 | Bruening et al. ............. 717/104 |
| 2007/0260846 | A1 | * | 11/2007 | Burton .......................... 711/216 |
| 2008/0077762 | A1 | * | 3/2008 | Scott et al. ..................... 711/170 |

OTHER PUBLICATIONS

Xie, C. et al., "Design and Implementation of Hierarchy Cache Using Page File," Wuhan University Journal of Natural Sciences, Nov. 2004, pp. 890-894, vol. 9, No. 6.
Benveniste, C.D. et al., "Cache-Memory Interfaces in Compressed Memory Systems," IEEE Transactions on Computers, Nov. 2001, pp. 1106-1116, vol. 50, No. 11.

* cited by examiner

*Primary Examiner* — Charles Rones
*Assistant Examiner* — Ryan Dare
(74) *Attorney, Agent, or Firm* — Griffiths & Seaton PLLC

(57) ABSTRACT

A method of managing data in a cache memory storage subsystem upon a cache write operation includes determining a first number of non-contiguously written sectors on a track in the cache and comparing the first number with a second, threshold number. If the first number exceeds the second number, a full background stage operation is issued to fill the non-contiguously written sectors with unmodified data from a storage medium. A corresponding system includes a cache manager module operating on the storage subsystem. Upon a determination that a cache write operation on a track has taken place, the cache manager module determines a first number of non-contiguously written sectors on the track, compares the first number with a second, predetermined threshold number, and issues a background stage operation to fill the non-contiguously written sectors with unmodified data from a storage medium if the first number exceeds the second number.

15 Claims, 3 Drawing Sheets

METHOD TO INCREASE PERFORMANCE OF NON-CONTIGUOUSLY WRITTEN SECTORS

BACKGROUND OF THE INVENTION

1. Field of the Invention

The present invention relates in general to computers, and, more particularly, to a system and method to increase performance of non-contiguously written sectors in cache storage subsystems.

2. Description of the Prior Art

A storage subsystem, such as the International Business Machines (IBM®) Enterprise Storage Server (ESS®), will receive Input/Output (I/O) requests directed toward an attached storage system. The attached storage system may comprise an enclosure including numerous interconnected disk drives, such as a Direct Access Storage Device (DASD), Redundant Array of Independent Disks (RAID Array), Just A Bunch of Disks (JBOD), etc. If I/O requests are received at a faster rate than they can be processed, then the storage subsystem will queue the I/O requests in a storage cache, which may comprise one or more gigabytes of volatile storage, e.g., Random Access Memory (RAM), Dynamic Random Access Memory (DRAM), etc. A copy of certain modified (write) data may also be placed in a non-volatile storage unit (NVS), such as a battery-backup volatile memory, to provide additional protection of write data in the event of a failure at the storage subsystem.

An entry is included in a Least Recently Used (LRU) list for each track in cache. A track can be staged from the storage system for cache to return to a read request. Additionally, write data for a track may be stored in cache before being transferred to the attached storage system. When additional space in cache is needed to buffer additional requested read data and modified data, tracks indicated at the LRU end of the LRU list are destaged to disk. An entry is added to the most recently used (MRU) end of the LRU list for each track added to cache. Each entry in the LRU list comprises a control block that indicates the current status of a track, the location in cache, and the location in the storage system. An additional NVS LRU list is maintained for tracks in the NVS. The cache and NVS LRU lists include entries for tracks in both NVS and cache.

Tracks written with "holes" or non-contiguously written sectors cause slow cached write performance. Holes in tracks result in cache sector misses on each write. In the worst cases, every other sector of the track becomes write modified. Destaging the tracks also results in poor disk write performance since a separate write command must be issued for each sector. On systems using RAID, the destage is further slowed down by the necessity to perform multiple drive operations for each of the single sector writes.

In light of the foregoing, a need exists for a system and method to increase performance in the event of non-contiguously written sectors on a particular track. In addition, the system and method should take advantage of existing system resources and constraints to minimize cost and complexity while maximizing efficiency in a particular implementation.

SUMMARY OF THE INVENTION

In one embodiment the present invention is a method of managing data in a cache memory storage subsystem upon a cache write operation comprising determining a first number of non-contiguously written sectors on a track in the cache and comparing the first number with a second, predetermined threshold number, wherein, if the first number exceeds the second number, a full background stage operation is issued to fill the non-contiguously written sectors with unmodified data from a storage medium.

In another embodiment, the present invention is a system for managing data in a cache memory storage subsystem comprising a cache manager module operating on the storage subsystem, wherein, upon a determination that a cache write operation on a track has taken place, the cache manager module determines a fist number of non-contiguously written sectors on the track, compares the first number with a second, predetermined threshold number, and issues a background stage operation to fill the non-contiguously written sectors with unmodified data from a storage medium if the first number exceeds the second number.

In another embodiment, the present invention is an article of manufacture including code for managing data in a cache memory storage subsystem upon a cache write operation, wherein the code is capable of causing operations to be performed, comprising: determining a first number of non-contiguously written sectors on a track in the cache, and comparing the first number with a second, predetermined threshold number, wherein, if the first number exceeds the second number, a full background stage operation is issued to fill the non-contiguously written sectors with unmodified data from a storage medium.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
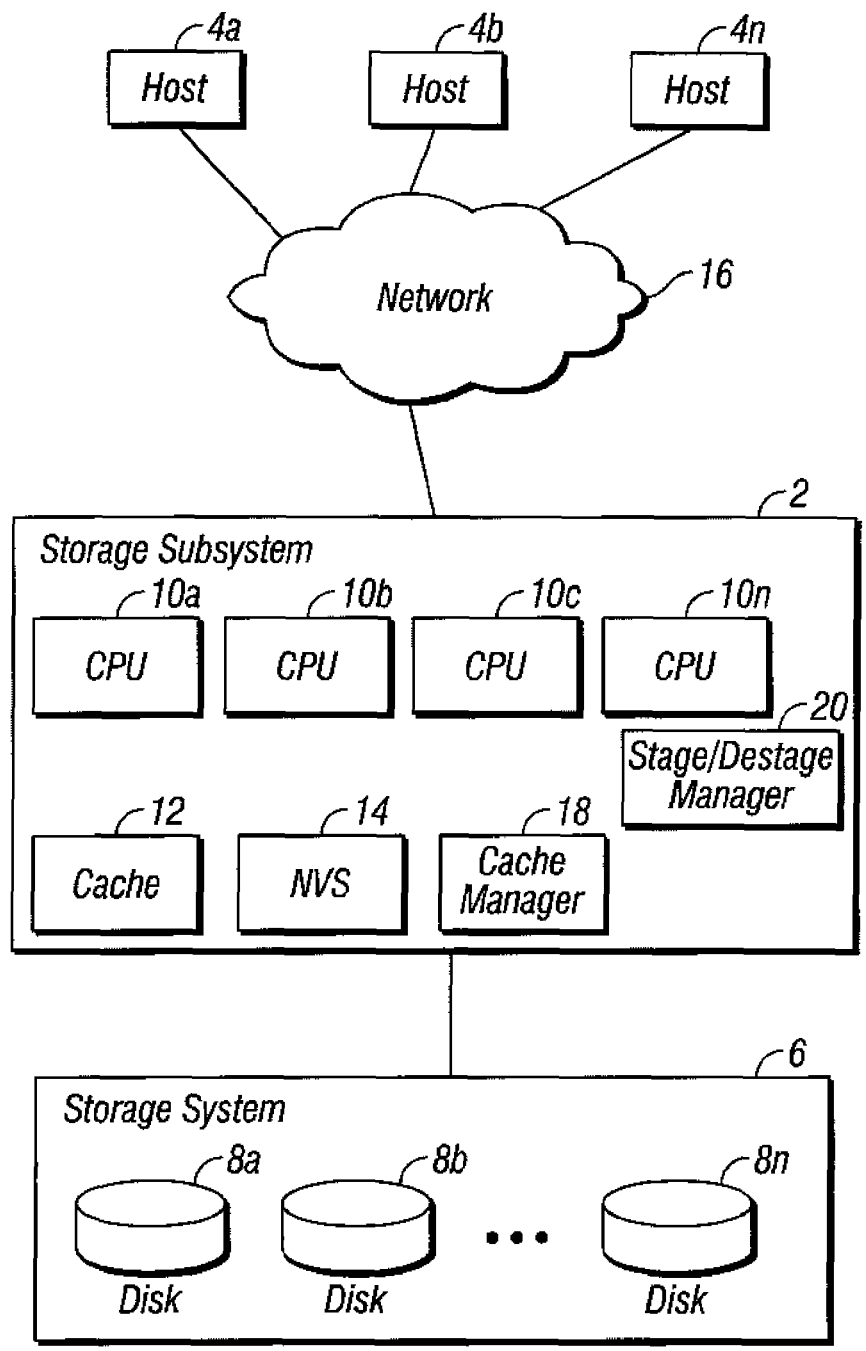
FIG. 1 illustrates a computing environment in which aspects of the invention are implemented.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

The schematic flow chart diagrams included are generally set forth as logical flow-chart diagrams. As such, the depicted order and labeled steps are indicative of one embodiment of the presented method. Other steps and methods may be conceived that correspond in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Turning to FIG. 1, a storage subsystem computing environment in which aspects of the present invention are implemented is depicted. A storage subsystem 2 receives I/O requests from hosts 4a, 4b ... 4n directed to tracks in a storage system 6, which comprises one or more hard disk drives 8a, 8b ... 8n. The storage system 6 and disk drives 8a, 8b ... 8n may be configured as a DASD, one or more RAID ranks, etc. The storage subsystem 2 further includes one or more central processing units (CPUs) 10a, 10b, 10c ... 10n, a cache 12 comprising a volatile memory to store tracks, and a non-volatile storage unit REVS) 14 in which certain dirty or modified tracks in cache are buffered. The hosts 4a, 4b ... 4n communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices and the NVS 14 implemented in one or more high-speed non-volatile storage devices, such as a battery-backed-up volatile memory. A cache manager module 18 comprises either a hardware component or process executed by one of the CPUs 10a, 10b ... 10n that manages the cache 12. A stage/destage manager module 20 comprises a software or hardware component that manages stage and destage operations.

Figure 2:
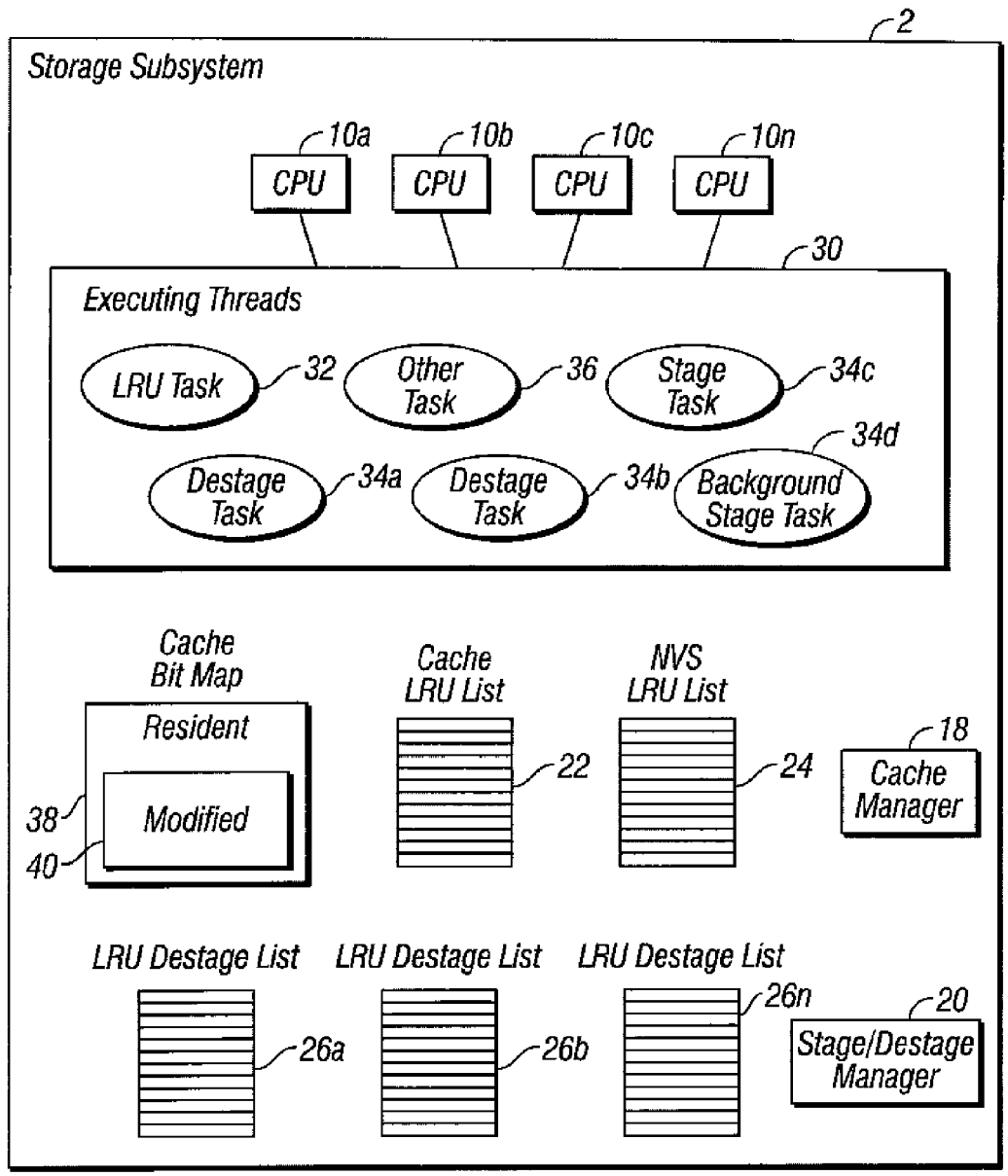
FIG. 2 illustrates example program components used to implement cache management operations in implementations where the disks in the storage system are organized into a RAID topology.

FIG. 2 illustrates example program components used to implement cache management operations in implementations where the disks 8a, 8b ... 8n in the storage system 6 are organized into RAID ranks. FIG. 2 illustrates a cache LRU list 22 in which every track in cache 12 is listed, an NVS list 24 in which every track in the NVS 14 is listed, and one RAID Rank LRU list 26a, 26b ... 26n for each RAID rank configured in the storage system 6. The CPUs 10a, 10b ... 10n would execute threads to perform various operations. The executing threads 30 include an LRU task thread 32 that scans the cache LRU list 22 looking for entries for modified tracks that satisfy certain criteria, such as a track in a specified RAID rank, multiple executing destage threads 34a and 34b that are called to destage a track from cache 12 to the storage system 6, multiple executing stage threads 34c and background stage threads 34d that are called to stage a track from storage system 6 to cache 12 or execute a full background stage operation as will be later described, and other threads 36 performing any other storage subsystem 2 operation.

In addition, FIG. 2 illustrates a cache bit map 38, which includes a resident portion and a modified portion 40. Cache bit map 38 is maintained to assist in allocating file space for data in the cache. Modified portion 40 is a subset of resident portion 38. Bit map 38 can describe the allocation of each block or sector in a tack in the cache. Modified portion 40 can be compared against resident portion 38 to determine if there are any non-contiguous sectors on a particular tack, or "holes."

Figure 3:
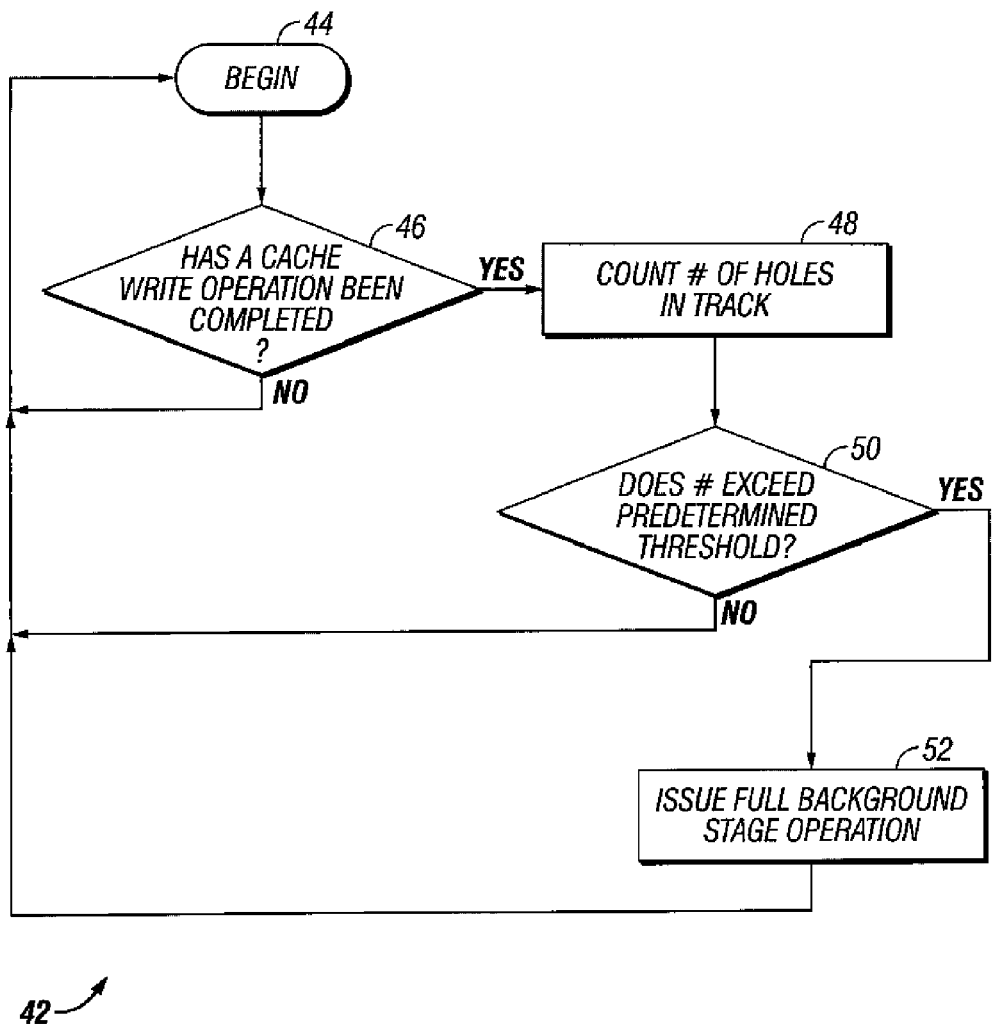
FIG. 3 illustrates an example method of managing data in a cache storage subsystem according to the present invention.

FIG. 3 describes an example method 42 of managing data in accordance with the present invention. The method 42 begins (step 44) by the storage subsystem querying whether a cache write operation has been completed (step 46). The determination of whether a cache write operation has been completed can be performed by a CPU 10 or a cache manager module 18 or a similar processing component located as part of subsystem 2 or elsewhere. Cache manager module 18 essentially keeps track of the status of all tracks in cache. Cache module 18 can compare modified bit map 40 with resident bit map 38 to make a determination as to which sectors in a particular track are non-contiguous. Further, module 18 can count the number of non-contiguous instances, or holes exist in a particular track (step 48). The number of holes can be then compared with a predetermined threshold number. In one embodiment, the predetermined threshold may be six (6) instances. If the counted number of holes exceeds the predetermined threshold (step 50), the module 18 can issue a full background stage operation, causing unmodified data to be staged from a disk 8 or other storage medium in storage system 6 to fill in the holes (step 52). The method 42 then begins anew.

Reference to a "background" stage refers to an executing thread 30 which is run in the background or on a separate executing thread that the cache manager module 18 may be executing at a particular time. As a result of invoking a stage operation, all non-contiguous sectors in a particular track are filled with unmodified data. Because an affected track which has underwent a background stage operation has all sectors which are then filled, an entire image of data can be constructed when incorporating the particular data into a write command. The full track is essentially now in cache.

Following a full background stage operation, the full track can be written to disk 8 or a similar storage medium with a single write command. For example, the full track can then be destaged to disk following an LRU algorithm previously described. This replaces the necessity of having to construct a single sector write command for every other modified sector in a track not subjected to the present invention.

Again, the present invention increases host write and destage performance of modified tracks with a large number of non-contiguous sectors or holes by calculating the number of holes in the track at the completion of each cache write operation. If a large number of holes are present, a full track stage of the track is issued in the background. Following the completion of the background stage, subsequent write performance is improved because what were sector misses are now cache hits. Destage performance is also increased since the destage is now a full track write to the disks.

At the completion of a cache write operation, a count of the number of holes in the track is calculated. If the number of holes calculated on the track is greater than a predetermined threshold, a fill track background stage is issued. Since the full track is now in cache, subsequent writes to the track are faster, since they are now cache hits. Destage performance is improved since the full track can either be grouped for a full stride write, or, if the track is destaged by itself, the track can be implemented using a full track write instead of a plurality of single sector writes.

Software and/or hardware to implement the method previously described, such as the described full background stage, can be created using tools currently known in the art. The implementation of the described system and method involves no significant additional expenditure of resources or additional hardware than what is already in used in many storage subsystems, making the implementation cost-effective.

Implementing and utilizing the example systems and methods as described can provide a simple, effective method of increasing performance in a computer system featuring a cache storage subsystem. While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data in a cache of a memory storage subsystem upon receiving a cache write operation, comprising:
   determining a first number of non-contiguously written sectors on a track of data in the cache; and
   comparing the first number with a second, predetermined threshold number of non-contiguously written sectors, wherein:
   if the first number exceeds the second number, issuing a full background stage operation to a storage medium to fill in the non-contiguously written sectors on the track of the data with unmodified data from the storage medium such that the cache includes a full track of the data, and
   the unmodified data from the storage medium is data missing from the full track of the data in the cache that constitutes the non-contiguously written sectors.

2. The method of claim 1, further including, previous to the step of determining a first number of non-contiguously written sectors on the track of the data in the cache, detecting that the cache write operation has taken place.

3. The method of claim 1, further including, subsequent to the step of issuing the full background stage operation, performing a destage operation to move the full track of the data from the cache to the storage medium.

4. The method of claim 3, wherein the destage operation is performed with a single write command.

5. The method of claim 1, wherein determining the first number of non-contiguously written sectors is performed using a cache bit map that is maintained by the storage subsystem.

6. The method of claim 5, wherein the cache bit map further includes a resident bit map and a modified bit map, the resident and modified bit maps compared to determine the first number of non-contiguously written sectors on the track.

7. A system for managing data in a cache memory storage subsystem, comprising:
   a cache memory;
   a storage medium coupled to the cache memory; and
   a cache manager module coupled to the cache memory and the storage medium, wherein, upon a determination that a cache write operation on a track of data stored in the cache has taken place, the cache manager module:
   determines a first number of non-contiguously written sectors on the track,
   compares the first number with a second, predetermined threshold number of non-contiguously written sectors, and
   issues a background stage operation to the storage medium to fill in the non-contiguously written sectors on the track of the data with unmodified data from the storage medium such that the cache includes a full track of the data if the first number exceeds the second number,
   wherein the unmodified data from the storage medium is data missing from the full track of the data in the cache that constitutes the non-contiguously written sectors.

8. The system of claim 7, further including a destage manager coupled to the cache and the storage medium, the destage manager configured to perform a destage operation to move the full track of the data from the cache to the storage medium.

9. The system of claim 8, wherein the destage operation is performed with a single write command.

10. The system of claim 7, further including a resident and modified cache bit map operating on the storage subsystem, the cache manager comparing the resident and modified bit map to determine the first number.

11. An non-transitory memory device including code for managing data in a cache memory storage subsystem upon a cache write operation, wherein the code is configured to cause operations to be performed comprising:
    determining a first number of non-contiguously written sectors on a track of data in the cache; and
    comparing the first number with a second, predetermined threshold number of non-contiguously written sectors, wherein:

if the first number exceeds the second number, issuing a full background stage operation to a storage medium to fill in the non-contiguously written sectors on the track of the data with unmodified data from the storage medium such that the cache includes a full track of the data, and the unmodified data from the storage medium is data missing from the full track of the data in the cache that constitutes the non-contiguously written sectors.

12. The memory device of claim 11, further including, previous to the step of determining the first number of non-contiguously written sectors on the track of the data in the cache, detecting that the cache write operation has taken place.

13. The memory device of claim 11, further including, subsequent to the step of issuing the full background stage operation, performing a destage operation to move the full track of the data from the cache to the storage medium.

14. The memory device of claim 13, wherein the destage operation is performed with a single write command.

15. The memory device of claim 11, further including comparing a resident and modified bit map to determine the first number of non-contiguously written sectors on the track, the resident and modified bit maps maintained by the storage subsystem.

* * * * *